US012810803B2

(12) United States Patent
Jang et al.

(10) Patent No.: US 12,810,803 B2
(45) Date of Patent: Nov. 24, 2026

(54) DISPLAY DEVICE HAVING DISPLAY PANEL DRIVER THAT ALTERNATELY OUTPUTS POWER VOLTAGES TO UPPER AND LOWER AREAS OF BLOCKS AND ELECTRONIC DEVICE INCLUDING THE SAME

(71) Applicant: Samsung Display Co., LTD., Yongin-si (KR)

(72) Inventors: Hyoungwook Jang, Yongin-si (KR); Sang-Hee Jang, Yongin-si (KR)

(73) Assignee: Samsung Display Co., LTD., Yongin-Si (KR)

(*) Notice: Subject to any disclaimer, the term of this patent is extended or adjusted under 35 U.S.C. 154(b) by 0 days.

(21) Appl. No.: 19/325,756

(22) Filed: Sep. 11, 2025

(65) Prior Publication Data

US 2026/0120636 A1 Apr. 30, 2026

(30) Foreign Application Priority Data

Oct. 31, 2024 (KR) ........................ 10-2024-0152112

(51) Int. Cl.
*G09G 3/3233* (2016.01)

(52) U.S. Cl.
CPC ... *G09G 3/3233* (2013.01); *G09G 2300/0842* (2013.01); *G09G 2320/0233* (2013.01); *G09G 2320/0673* (2013.01); *G09G 2330/021* (2013.01)

(58) Field of Classification Search
CPC ......... G09G 3/3233; G09G 2300/0842; G09G 2320/0233; G09G 2320/0673; G09G 2330/021; G09G 3/3291; G09G 3/32; G09G 3/3258
See application file for complete search history.

(56) References Cited

U.S. PATENT DOCUMENTS

| | | | | |
|---|---|---|---|---|
| 2007/0030219 A1* | 2/2007 | Park | G09G 3/3233 | 345/76 |
| 2010/0177086 A1* | 7/2010 | Nakamura | G09G 3/3258 | 345/76 |
| 2014/0285535 A1* | 9/2014 | Pyo | G09G 3/3291 | 345/77 |
| 2026/0073881 A1* | 3/2026 | Kim | G09G 3/32 | |

FOREIGN PATENT DOCUMENTS

| | | |
|---|---|---|
| CN | 103688302 | 3/2014 |
| CN | 113964174 | 1/2022 |
| KR | 10-2014-0116659 | 10/2014 |

* cited by examiner

*Primary Examiner* — Richard J Hong
(74) *Attorney, Agent, or Firm* — Innovation Counsel LLP

(57) ABSTRACT

A display device comprises a display panel including a first block and a second block, and a display panel driver that generates a first power voltage based on a max grayscale of input image data for the first block, generates a second power voltage based on a max grayscale of input image data for the second block, and outputs the first power voltage and the second power voltage to the display panel. The display panel driver alternately outputs the first power voltage to an upper area and a lower area of the first block and alternately output the second power voltage to an upper area and a lower area of the second block.

20 Claims, 11 Drawing Sheets

DISPLAY DEVICE HAVING DISPLAY PANEL DRIVER THAT ALTERNATELY OUTPUTS POWER VOLTAGES TO UPPER AND LOWER AREAS OF BLOCKS AND ELECTRONIC DEVICE INCLUDING THE SAME

CROSS-REFERENCE TO RELATED APPLICATION(S)

This application claims priority to and the benefits of Korean Patent Application No. 10-2024-0152112 under 35 U.S.C. § 119, filed on Oct. 31, 2024, in the Korean Intellectual Property Office (KIPO), the entire contents of which are incorporated herein by reference.

BACKGROUND

1. Technical Field

Embodiments relate to a display device and an electronic device including the display device. More particularly, embodiments relate to a display device and an electronic device including the display device for precisely setting a power voltage to reduce a power consumption and to improve a display quality.

2. Description of the Related Art

In general, a display device includes a display panel and a display panel driver. The display panel includes gate lines, data lines, and pixels. The display panel driver includes a gate driver for providing a gate signal to the gate lines, a data driver for providing a data voltage to the data lines, a power voltage generator for generating a power voltage to outputs the power voltage to the display panel, and a driving controller for controlling the gate driver, the data driver, and the power voltage generator.

In order to reduce a power consumption of the display device, the display panel may be divided into blocks. The driving controller may determine levels of power voltages applied to each of the blocks, and the power voltage generator may output the power voltages to the blocks through power voltage lines. However, a voltage drop (IR drop) may occur for the power voltages transmitted through the power voltage lines. Therefore, a boundary line due to a luminance difference at a boundary between the blocks may be recognized by a user.

SUMMARY

Embodiments provide a display device for preventing a boundary line due to a luminance difference at a boundary between blocks.

Embodiments provide an electronic device including the display device.

In an embodiment of a display device, the display device comprises a display panel including a first block and a second block, and a display panel driver that generates a first power voltage based on a max grayscale of input image data for the first block, generates a second power voltage based on a max grayscale of input image data for the second block, and outputs the first power voltage and the second power voltage to the display panel. The display panel driver may alternately output the first power voltage to an upper area and a lower area of the first block and alternately output the second power voltage to an upper area and a lower area of the second block.

In an embodiment, the first block may be positioned on the second block.

In an embodiment, the first block may include horizontal power lines extending in a horizontal direction and to which the first power voltage is applied, and vertical power lines extending in a vertical direction and to which the first power voltage is applied. The second block may include horizontal power lines extending in the horizontal direction and to which the second power voltage is applied, and vertical power lines extending in the vertical direction and to which the second power voltage is applied.

In an embodiment, as the max grayscale of the input image data for the first block is large, the first power voltage may be large. As the max grayscale of the input image data for the second block is large, the second power voltage may be large.

In an embodiment, a voltage of the upper area of the first block and a voltage of the lower area of the first block may be the first power voltage. A voltage of the upper area of the second block and a voltage of the lower area of the second block may be the second power voltage.

In an embodiment, in case that a position of the first block moves away from the upper area of the first block or the lower area of the first block, a voltage drop of the first block may increase.

In an embodiment, in case that a position of the second block moves away from the upper area of the second block or the lower area of the second block, a voltage drop of the second block may increase.

In an embodiment, in case that the position of the first block moves away from the upper area of the first block and approaches the lower area of the first block, a voltage of the first block may decrease and then increase.

In an embodiment, in case that the position of the second block moves away from the upper area of the second block and approaches the lower area of the second block, a voltage of the second block may decrease and then increase.

In an embodiment, in case that the first power voltage is substantially equal to the second power voltage, the voltage of the lower area of the first block may be substantially equal to the voltage of the upper area of the second block.

In an embodiment, in case that the first power voltage is different from the second power voltage, the display panel driver may perform a gamma correction on the input image data for the first block and the input image data for the second block.

In an embodiment, in case that the gamma correction is performed, for a same grayscale, a luminance of the first block may be substantially equal to a luminance of the second block.

In an embodiment of an electronic device, the electronic device comprises a display panel including a first block and a second block, a display panel driver that generates a first power voltage based on a max grayscale of input image data for the first block, generates a second power voltage based on a max grayscale of input image data for the second block, and outputs the first power voltage and the second power voltage to the display panel, and a power supply that provides a power to the display panel and the display panel driver. The display panel driver may alternately output the first power voltage to an upper area and a lower area of the first block and alternately output the second power voltage to an upper area and a lower area of the second block.

In an embodiment, the first block may be positioned on the second block.

In an embodiment, the first block may include horizontal power lines extending in a horizontal direction and to which the first power voltage is applied, and vertical power lines extending in a vertical direction and to which the first power voltage is applied. The second block may include horizontal power lines extending in the horizontal direction and to which the second power voltage is applied, and vertical power lines extending in the vertical direction and to which the second power voltage is applied.

In an embodiment, as the max grayscale of the input image data for the first block is large, the first power voltage may be large. As the max grayscale of the input image data for the second block is large, the second power voltage may be large.

In an embodiment, a voltage of the upper area of the first block and a voltage of the lower area of the first block may be the first power voltage. A voltage of the upper area of the second block and a voltage of the lower area of the second block may be the second power voltage.

In an embodiment, in case that a position of the first block moves away from the upper area of the first block or the lower area of the first block, a voltage drop of the first block may increase.

In an embodiment, in case that a position of the second block moves away from the upper area of the second block or the lower area of the second block, a voltage drop of the second block may increases.

In an embodiment, in case that the position of the first block moves away from the upper area of the first block and approaches the lower area of the first block, a voltage of the first block may decrease and then increase.

According to the display device and the electronic device, each of the power voltages may be alternately applied to the upper area and the lower area of each of the blocks. Accordingly, the boundary line due to the luminance difference at the boundary between the blocks BL may not be visible to a user.

BRIEF DESCRIPTION OF THE DRAWINGS

The above and other features of embodiments will become more apparent by describing in detailed embodiments thereof with reference to the accompanying drawings, in which.

DETAILED DESCRIPTION OF THE EMBODIMENTS

Hereinafter, the invention will be described in more detail with reference to the accompanying drawings.

Figure 1:
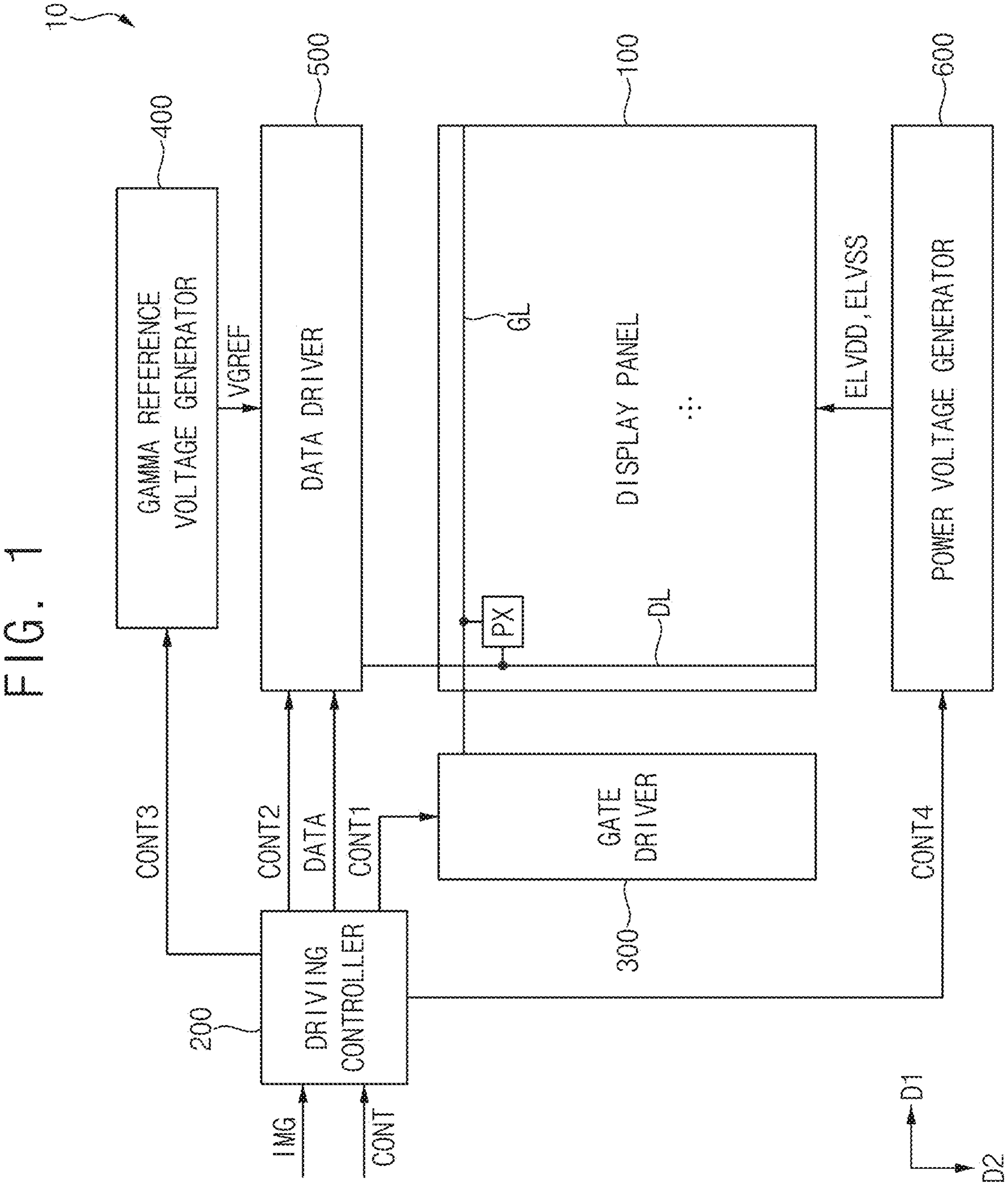
FIG. 1 is a schematic block diagram showing a display device according to embodiments.

FIG. 1 is a schematic block diagram showing a display device 10 according to embodiments.

Referring to FIG. 1, a display device 10 may include a display panel 100 and a display panel driver. The display panel driver may include a driving controller 200, a gate driver 300, a gamma reference voltage generator 400, and a data driver 500. The display panel driver may further include a power voltage generator 600.

For example, the driving controller 200 and the data driver 500 may be integral with each other. For example, the driving controller 200, the gamma reference voltage generator 400, and the data driver 500 may be integral with each other. For example, the driving controller 200, the gamma reference voltage generator 400, the data driver 500, and the power voltage generator 600 may be integral with each other. A driving module, in which at least the driving controller 200 and the data driver 500 are integral with each other, may be named a timing controller embedded data driver (TED).

The display panel 100 may include a display area for displaying an image and a peripheral area arranged adjacent to the display area.

For example, in the embodiment, the display panel 100 may be an organic light emitting diode display panel including an organic light emitting diode. For example, the display panel 100 may be a quantum-dot organic light emitting diode display panel including an organic light emitting diode and a quantum-dot color filter. For example, the display panel 100 may be a quantum-dot nano light emitting diode display panel including a nano light emitting diode and the quantum-dot color filter.

The display panel 100 may include gate lines GL, data lines DL, and pixels PX electrically connected to the gate lines GL and the data lines DL, respectively. The gate lines GL may extend in a first direction D1, and the data lines DL may extend in a second direction D2 intersecting the first direction D1.

The driving controller 200 may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the power voltage generator 600 based on the input control signal CONT, and output the fourth control signal CONT4 to the power voltage generator 600. For example, the fourth control signal CONT4 may be a power voltage level signal which determines a level of a power voltage.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be arranged in the driving controller 200 or may be arranged in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may provide the data voltage to the display panel 100 through the data line DL.

The power voltage generator 600 may generate a power voltage ELVDD and output the power voltage ELVDD to the display panel 100. The power voltage generator 600 may generate a low power voltage ELVSS and output the low power voltage ELVSS to the display panel 100. For example, the power voltage generator 600 may generate a gate driving voltage for driving the gate driver 300 and output the gate driving voltage to the gate driver 300, and may generate a data driving voltage for driving the data driver 500 and output the data driving voltage to the data driver 500. The power voltage ELVDD may be a high power applied to the pixels PX of the display panel 100, and the low power voltage ELVSS may be a low power applied to the pixels PX of the display panel 100.

Figure 2:
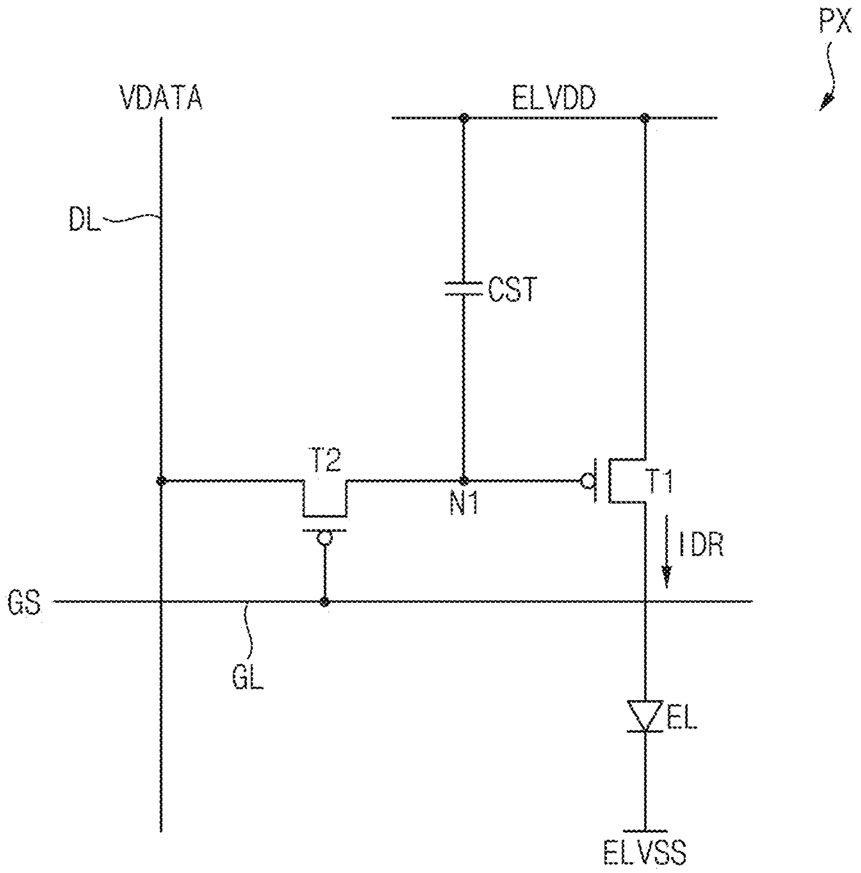
FIG. 2 is a schematic diagram of an equivalent circuit of an example of a pixel of FIG. 1.

FIG. 2 is a schematic diagram of an equivalent circuit of an example of a pixel PX of FIG. 1.

Referring to FIG. 1 and FIG. 2, a display panel 100 may include pixels PX. Each of the pixels PX may include a first transistor T1, a second transistor T2, a storage capacitor CST, and a light emitting element EL. In an embodiment, the first transistor T1 and the second transistor T2 may be PMOS transistors.

The first transistor T1 may include a gate electrode connected to a first node N1, a first electrode receiving a power voltage ELVDD, and a second electrode. The first transistor T1 may generate a driving current IDR in response to a voltage of the first node N1 and the power voltage ELVDD.

The second transistor T2 may include a gate electrode connected to a gate line GL transmitting a gate signal GS, a first electrode connected to a data line DL transmitting a data voltage VDATA, and a second electrode connected to the first node N1. The second transistor T2 may be turned on in response to a gate signal GS having a low level to provide the data voltage VDATA to the first node N1.

The storage capacitor CST may include a first electrode receiving the power voltage ELVDD and a second electrode connected to the first node N1. The storage capacitor CST may store the data voltage VDATA.

The light emitting element EL may include an anode connected to the second electrode of the first transistor T1 and a cathode receiving a low power voltage ELVSS. The light emitting element EL may emit a light based on the driving current.

However, embodiments are not limited thereto. In FIG. 2, each of the pixels PX is shown as including two transistors and one capacitor, but each of the pixels PX may include at least three or more transistors or at least two or more capacitors.

Figure 3:
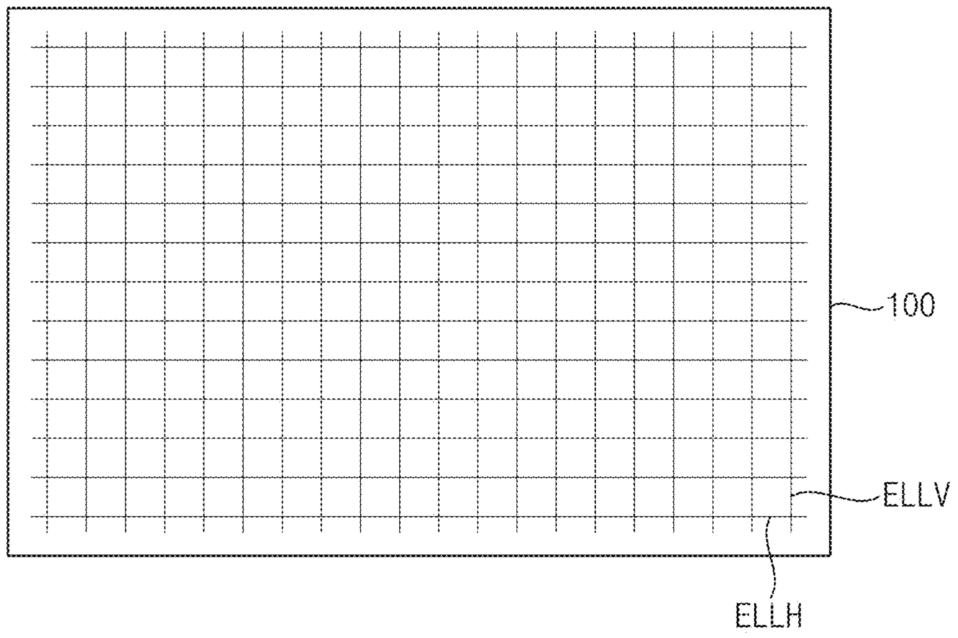
FIG. 3 is a schematic diagram showing a power line structure of a display panel of FIG. 1.

FIG. 3 is a schematic diagram showing a power line structure of a display panel 100 of FIG. 1.

Referring to FIGS. 1 to 3, the display panel 100 may include power lines ELLH to which the power voltage ELVDD is applied and extending in the first direction D1, and power lines ELLV to which the power voltage ELVDD is applied and extending in the second direction D2 different from the first direction D1. For example, the first direction D1 may be a horizontal direction, and the second direction D2 may be a vertical direction.

Figure 4:
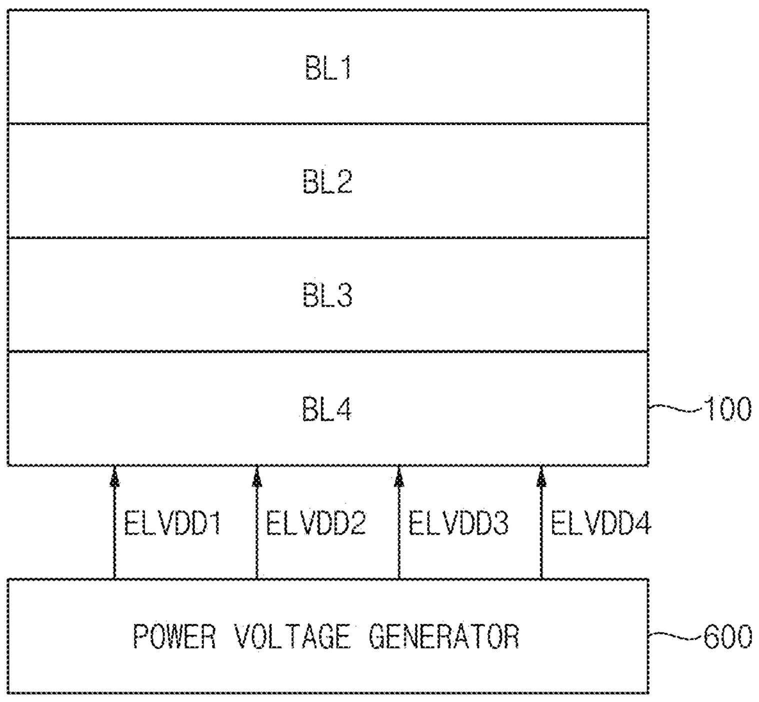
FIG. 4 is a schematic block diagram showing blocks of a display panel of FIG. 1 and a power voltage generator of FIG. 1.

FIG. 4 is a schematic block diagram showing blocks of a display panel 100 of FIG. 1 and a power voltage generator 600 of FIG. 1.

Referring to FIGS. 1 to 4, the display panel 100 may be divided into blocks. In an embodiment, the blocks may be divided in the second direction D2. For example, the blocks may include a first block BL1, a second block BL2, a third block BL3, and a fourth block BL4. The first block BL1 may be positioned on the second block BL2, the second block BL2 may be positioned on the third block BL3, and the third block BL3 may be positioned on the fourth block BL4. In case that the blocks are divided in the second direction D2, the blocks may have various shapes.

For example, the power voltage ELVDD may be applied to each of the power lines ELLV extending in the second direction D2 from an application portion of the power voltage ELVDD, and may be applied to an entire area of the display panel 100 along a mesh structure of the power lines ELLH extending in the first direction D1 and the power lines ELLV extending in the second direction D2. For example, the application portion of the power voltage ELVDD may be a terminal to which the power voltage generator 600 and each of the blocks are connected. For example, the power voltage ELVDD may include a first power voltage ELVDD1, a second power voltage ELVDD2, a third power voltage ELVDD3, and a fourth power voltage ELVDD4. The first power voltage ELVDD1 may be applied to the first block BL1, the second power voltage ELVDD2 may be applied to the second block BL2, the third power voltage ELVDD3 may be applied to the third block BL3, and the fourth power voltage ELVDD4 may be applied to the fourth block BL4.

The power voltage generator 600 may generate the power voltage ELVDD based on a max grayscale of the input image data IMG. For example, the power voltage generator 600 may generate the first power voltage ELVDD1 based on a max grayscale of the input image data IMG for the first block BL1. For example, the power voltage generator 600 may generate the second power voltage ELVDD2 based on a max grayscale of the input image data IMG for the second block BL2. For example, the power voltage generator 600 may generate the third power voltage ELVDD3 based on a max grayscale of the input image data IMG for the third block BL3. For example, the power voltage generator 600 may generate the fourth power voltage ELVDD4 based on a max grayscale of the input image data IMG for the fourth block BL4.

As the max grayscale of the input image data IMG is large, the power voltage ELVDD may be large. For example, as the max grayscale of the input image data IMG for the first block BL1 is large, the first power voltage ELVDD1 may be large. For example, as the max grayscale of the input image data IMG for the second block BL2 is large, the second power voltage ELVDD2 may be large. For example, as the max grayscale of the input image data IMG for the third block BL3 is large, the third power voltage ELVDD3 may be large. For example, as the max grayscale of the input image data IMG for the fourth block BL4 is large, the fourth power voltage ELVDD4 may be large. The max grayscale of the input image data IMG may be determined in units of frames of the input image data IMG, and the power voltage ELVDD may have a variable level in units of frames.

Figure 5:
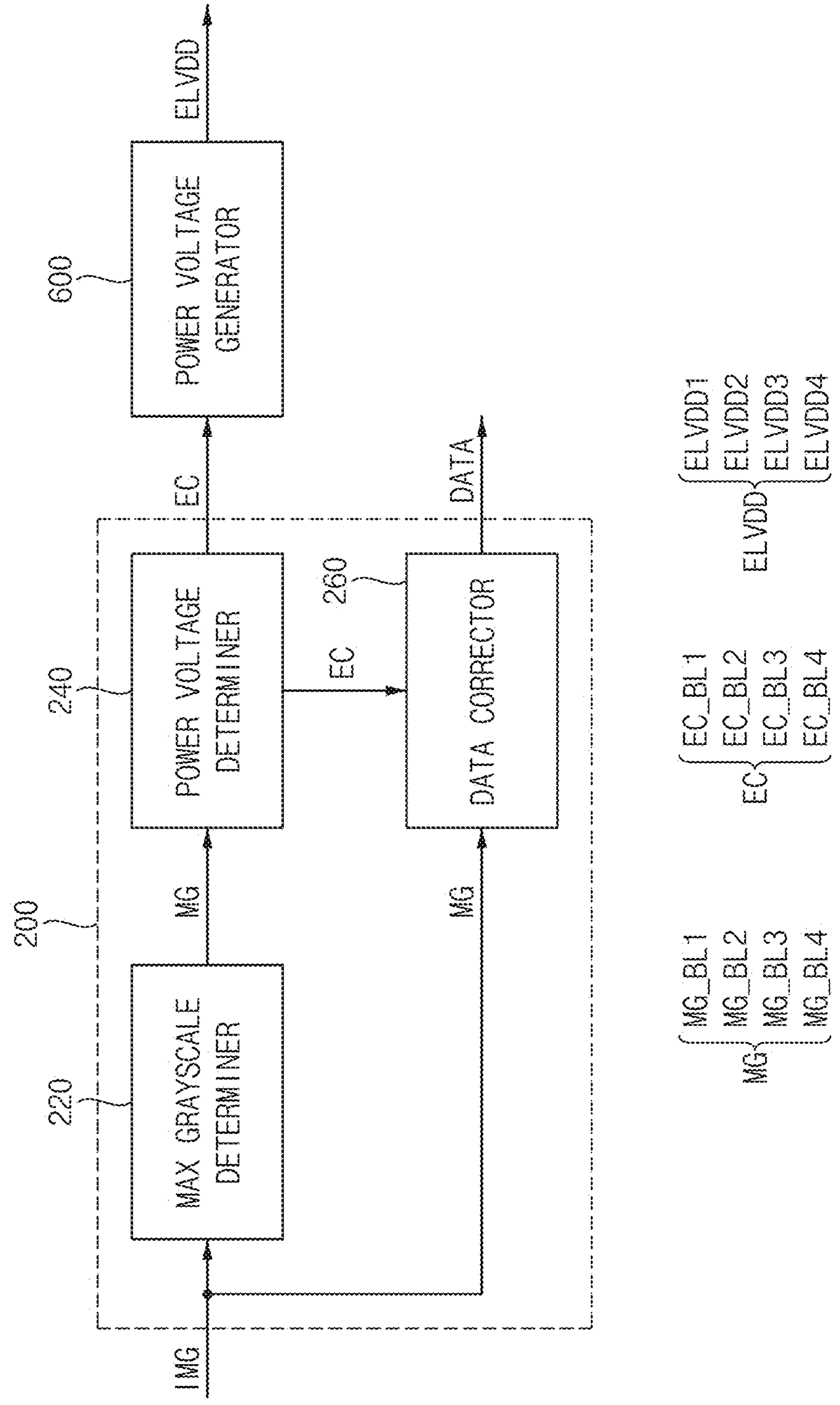
FIG. 5 is a schematic block diagram showing a driving controller and a power voltage generator of FIG. 1.

FIG. 5 is a schematic block diagram showing a driving controller 200 and a power voltage generator 600 of FIG. 1.

Referring to FIGS. 1 to 5, the display panel driver may include the driving controller 200 and the power voltage generator 600. The driving controller 200 may include a max grayscale determiner 220, a power voltage determiner 240, and a data corrector 260.

The max grayscale determiner 220 may determine the max grayscale MG based on the input image data IMG. For example, the max grayscale MG may include the max grayscale MG_BL1 of the input image data IMG for the first block BL1, the max grayscale MG_BL2 of the input image data IMG for the second block BL2, the max grayscale MG_BL3 of the input image data IMG for the third block BL3, and the max grayscale MG_BL4 of the input image data IMG for the fourth block BL4.

The power voltage determiner 240 may determine a voltage level EC based on the max grayscale MG of the input image data IMG. For example, the voltage level EC may include a voltage level EC_BL1 for the first block BL1, a voltage level EC_BL2 for the second block BL2, a voltage level EC_BL3 for the third block BL3, and a voltage level EC_BL4 for the fourth block BL4.

The data corrector 260 may perform a gamma correction on the input image data IMG based on the voltage level EC to generate the data signal DATA. In case that the gamma correction is performed, the blocks may have a same luminance for a same grayscale. For example, although the first power voltage ELVDD1 is different from the second power voltage ELVDD2, in case that the gamma correction is performed, the first block BL1 and the second block BL2 may have the same luminance for the same grayscale.

The power voltage generator 600 may generate the power voltage ELVDD based on the voltage level EC. For example, the power voltage ELVDD may include the first power voltage ELVDD1, the second power voltage ELVDD2, the third power voltage ELVDD3, and the fourth power voltage ELVDD4.

Figure 6:
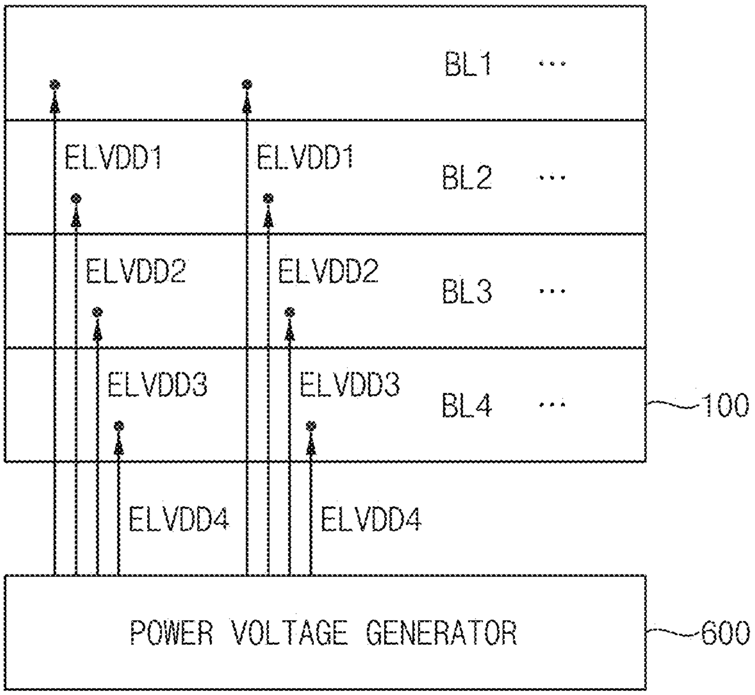
FIG. 6 is a schematic diagram showing a conventional connection structure of a display panel and a power voltage generator of FIG. 1.
Figure 7:
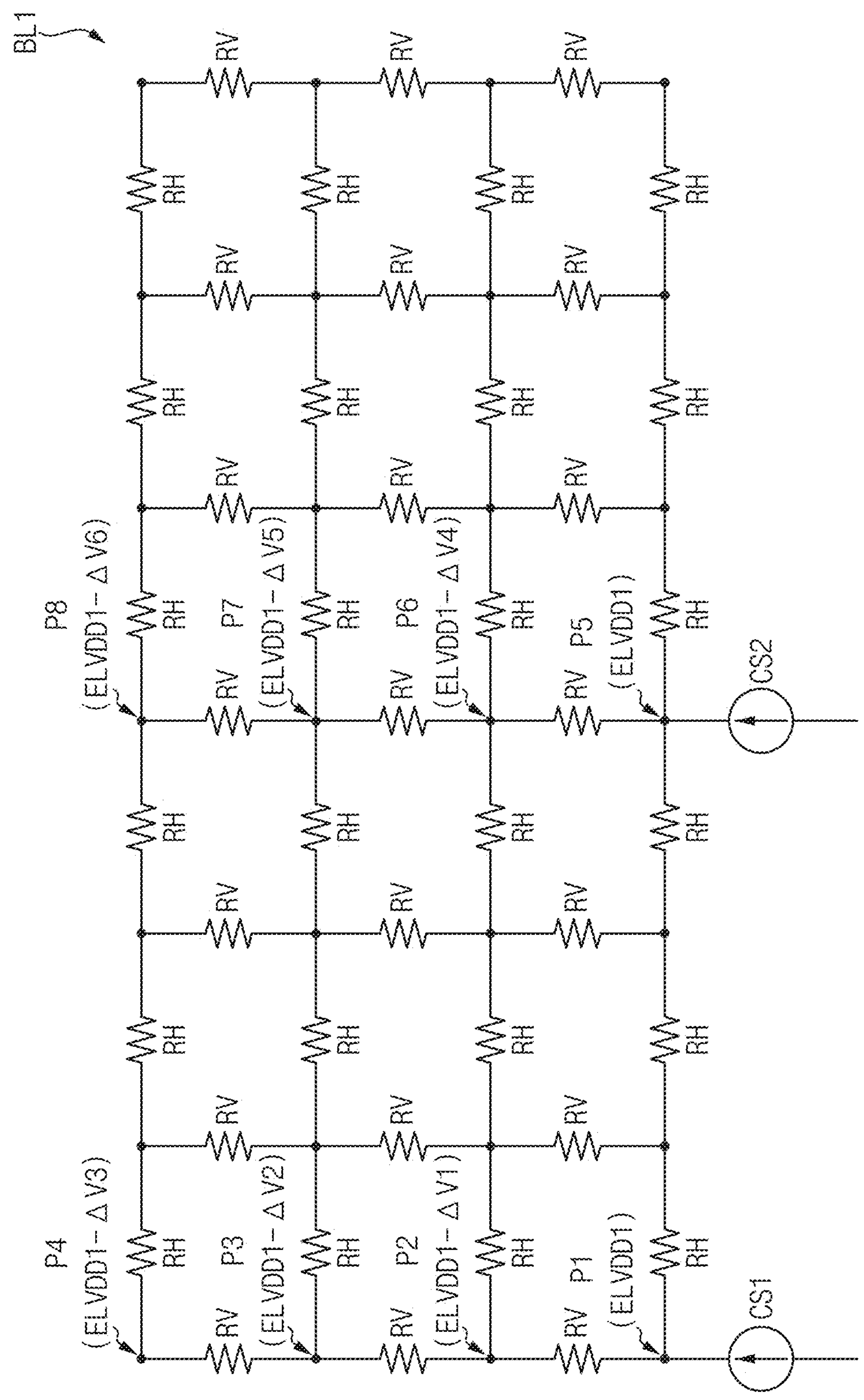
FIG. 7 is a schematic diagram showing a first block in a connection structure of FIG. 6.
Figure 8:
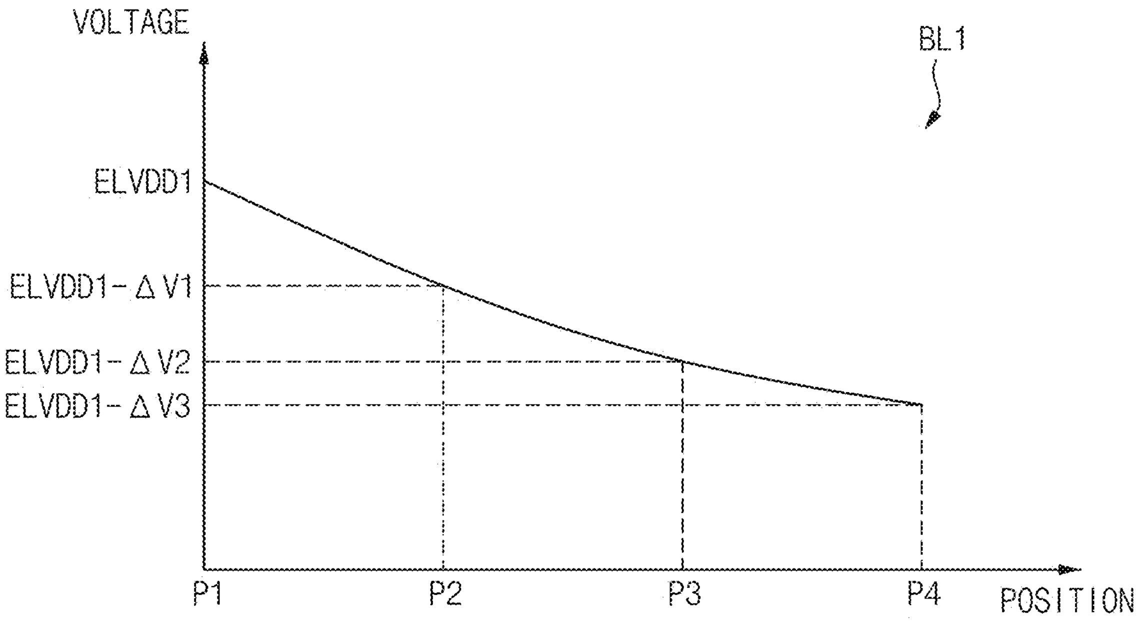
FIG. 8 is a graph showing a voltage according to a position in a first block of FIG. 7.
Figure 9:
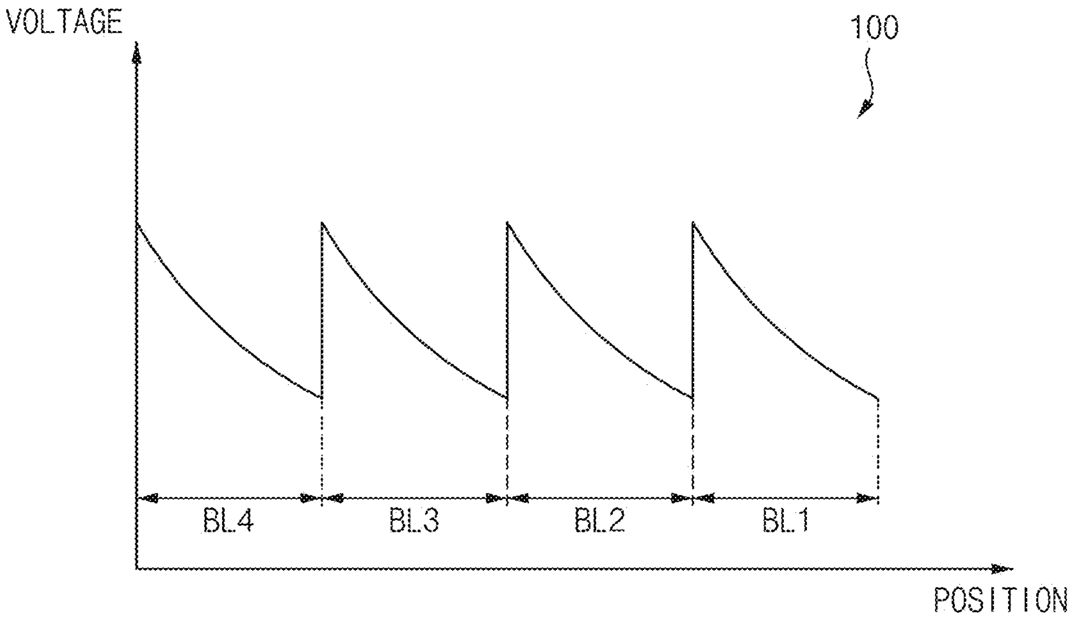
FIG. 9 is a graph showing a voltage according to a position in a first block, a second block, a third block, and a fourth block of FIG. 6.

FIG. 6 is a schematic diagram showing a conventional connection structure of a display panel 100 and a power voltage generator 600 of FIG. 1. FIG. 7 is a schematic diagram showing a first block BL1 in a connection structure of FIG. 6. FIG. 8 is a graph showing a voltage according to a position in a first block BL1 of FIG. 7. FIG. 9 is a graph showing a voltage according to a position in a first block BL1, a second block BL2, a third block BL3, and a fourth block BL4 of FIG. 6.

Referring to FIGS. 1 to 9, FIG. 6 shows a conventional connection structure of a display panel 100 and a power voltage generator 600. For example, in a conventional connection structure, each of the first power voltage ELVDD1, the second power voltage ELVDD2, the third power voltage ELVDD3, and the fourth power voltage ELVDD4 may be applied to a lower area of each of the first block BL1, the second block BL2, the third block BL3, and the fourth block BL4.

FIG. 7 shows a simplified equivalent circuit of the mesh structure of the power lines ELLH extending in the first direction D1 and the power lines ELLV extending in the second direction D2 in the first block BL1. A resistance in the first direction D1 is indicated by RH, and a resistance in the second direction D2 is indicated by RV.

The power voltage ELVDD may be applied to lower areas of the blocks. A current may flow along the resistance RH in the first direction D1 and the resistance RV in the second direction D2, and a voltage drop (IR drop) may occur. For example, the first power voltage ELVDD1 may be applied to the lower area of the first block BL1. The first power voltage ELVDD1 may be applied to a first position P1 using a first current source CS1 and a fifth position P5 using a second current source CS2. Therefore, a voltage of the first position P1 may be the first power voltage ELVDD1, and a voltage of the fifth position P5 may be the first power voltage ELVDD1. In case that a position of the first block BL1 moves away from the lower area of the first block BL1, the voltage drop of the first block BL1 may increase. For example, the position of the first block BL1 may move away from the lower area of the first block BL1 in an order of the first position P1, the second position P2, the third position P3, and the fourth position P4, and the voltage drop of the first block BL1 may increase in the order of the first position P1, the second position P2, the third position P3, and the fourth position P4. In case that the voltage of the first position P1 is ELVDD1, a voltage of the second position P2 may be ELVDD1-ΔV1, a voltage of the third position P3 may be ELVDD1-ΔV2, and a voltage of the fourth position P4 may be ELVDD1-ΔV3. Therefore, ΔV3 may be greater than ΔV2, and ΔV2 may be greater than ΔV1. For example, the position of the first block BL1 may move away from the lower area of the first block BL1 in the order of the fifth position P5, the sixth position P6, the seventh position P7, and the eighth position P8, and the voltage drop of the first block BL1 may increase in the order of the fifth position P5, the sixth position P6, the seventh position P7, and the eighth position P8. In case that the voltage of the fifth position P5 is ELVDD1, a voltage of the sixth position P6 may be ELVDD1-ΔV4, a voltage of the seventh position P7 may be ELVDD1-ΔV5, and a voltage of the eighth position P8 may be ELVDD1-ΔV6. Therefore, ΔV6 may be greater than ΔV5, and ΔV5 may be greater than ΔV4.

FIG. 8 is a graph showing a voltage of the first position P1, a voltage of the second position P2, a voltage of the third position P3, and a voltage of the fourth position P4. As described above, the voltage drop may increase in the order of the first position P1, the second position P2, the third position P3, and the fourth position P4. For example, the voltage of the first block BL1 may decrease in the order of the first position P1, the second position P2, the third position P3, and the fourth position P4.

Although FIG. 8 shows the voltage of the first block BL1, FIG. 9 shows the voltage of the first block BL1, a voltage of the second block BL2, a voltage of the third block BL3, and a voltage of the fourth block BL4. The fourth power voltage ELVDD4 may be applied to the lower area of the fourth block BL4, and in case that a position of the fourth block BL4 moves away from the lower area of the fourth block BL4, the voltage of the fourth block BL4 may decrease. The third power voltage ELVDD3 may be applied to the lower area of the third block BL3, and in case that a position of the third block BL3 moves away from the lower area of the third block BL3, the voltage of the third block BL3 may decrease. The second power voltage ELVDD2 may be applied to the lower area of the second block BL2, and in case that a position of the second block BL2 moves away from the lower area of the second block BL2, the voltage of the second block BL2 may decrease. The first power voltage ELVDD1 may be applied to the lower area of the first block BL1, and in case that the position of the first block BL1 moves away from the lower area of the first block BL1, the voltage of the first block BL1 may decrease.

As shown in FIG. 9, a voltage may change rapidly at a boundary between the first block BL1 and the second block BL2, a boundary between the second block BL2 and the third block BL3, and a boundary between the third block BL3 and the fourth block BL4. Therefore, a boundary line due to a luminance difference may be recognized by the user at the boundary between the first block BL1 and the second block BL2, the boundary between the second block BL2 and the third block BL3, and the boundary between the third block BL3 and the fourth block BL4.

Figure 10:
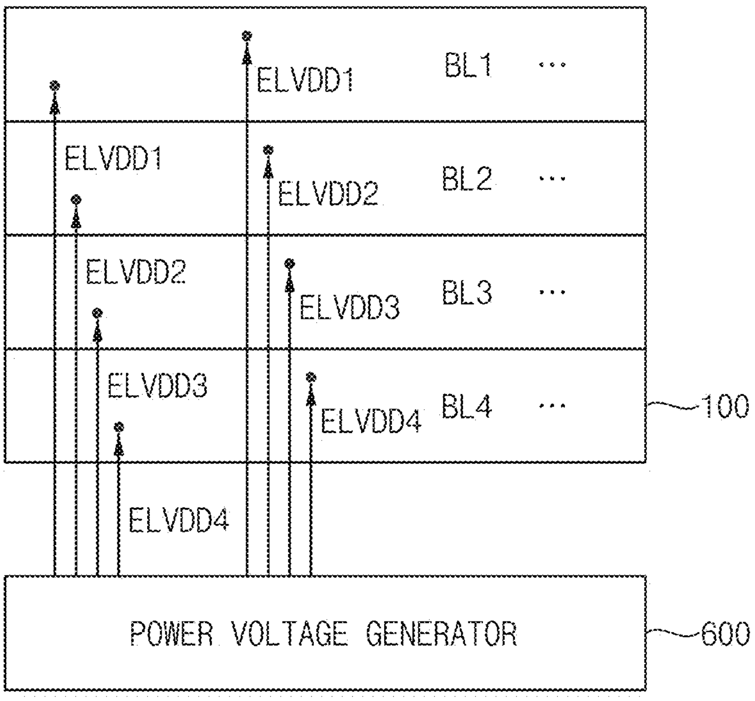
FIG. 10 is a schematic drawing showing a connection structure of a display panel and a power voltage generator of FIG. 1 according to embodiments.
Figure 11:
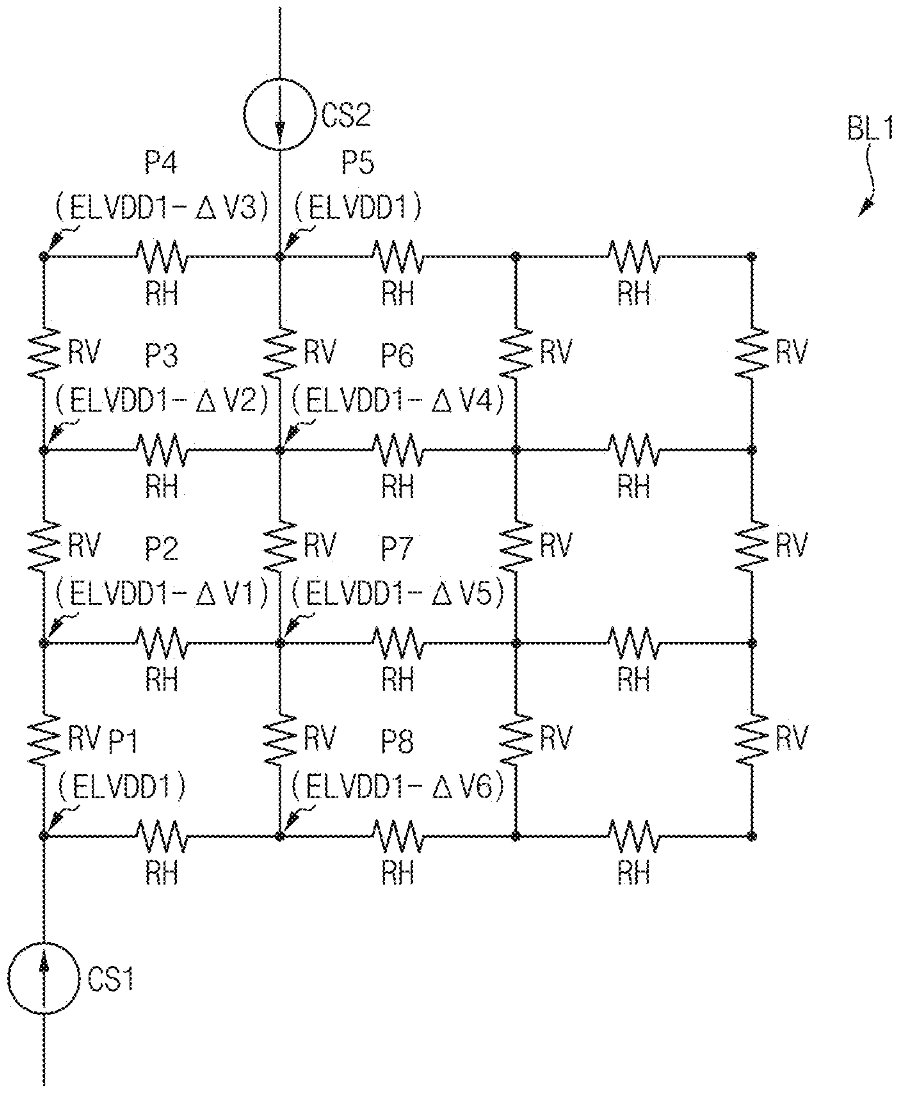
FIG. 11 is a schematic diagram showing a first block in a connection structure of FIG. 10.
Figure 12:
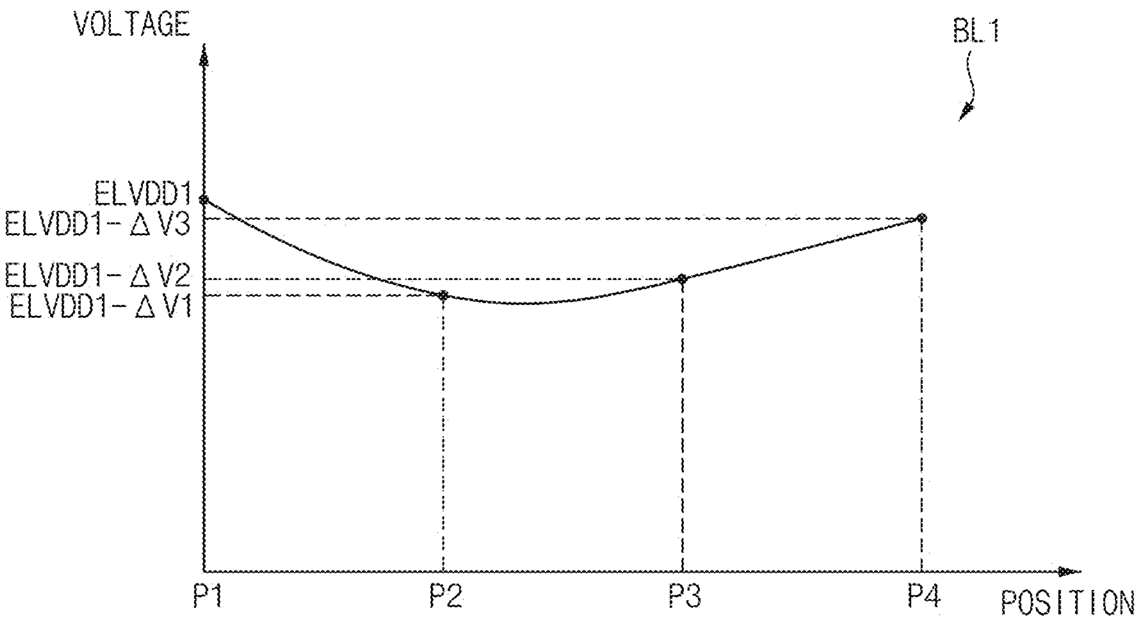
FIG. 12 is a graph showing a voltage according to a position in a first block of FIG. 11.
Figure 13:
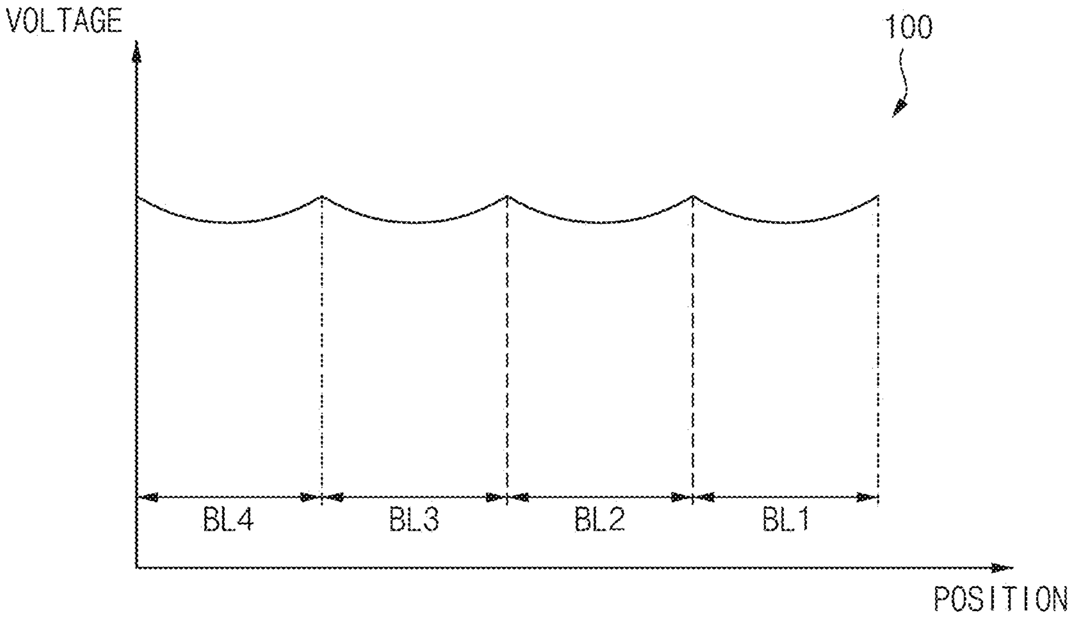
FIG. 13 is a graph showing a voltage according to a position in a first block, a second block, a third block, and a fourth block of FIG. 10.

FIG. 10 is a schematic drawing showing a connection structure of a display panel 100 and a power voltage generator 600 of FIG. 1 according to embodiments. FIG. 11 is a schematic diagram showing a first block BL1 in a connection structure of FIG. 10. FIG. 12 is a graph showing a voltage according to a position in a first block BL1 of FIG. 11. FIG. 13 is a graph showing a voltage according to a position in a first block BL1, a second block BL2, a third block BL3, and a fourth block BL4 of FIG. 10.

Referring to FIGS. 1 to 5 and FIGS. 10 to 13, FIG. 10 shows a connection structure of the display panel 100 and the power voltage generator 600. For example, in the connection structure, the first power voltage ELVDD1, the second power voltage ELVDD2, the third power voltage ELVDD3, and the fourth power voltage ELVDD4 may be alternately applied to the upper area and the lower area of each of the first block BL1, the second block BL2, the third block BL3, and the fourth block BL4.

FIG. 11 shows a simplified equivalent circuit of the mesh structure of the power lines ELLH extending in the first direction D1 and the power lines ELLV extending in the second direction D2 in the first block BL1. The resistance in the first direction D1 is indicated by RH, and the resistance in the second direction D2 is indicated by RV.

The power voltage ELVDD may be applied to an upper area and a lower area of the blocks. A current may flow along the resistance RH in the first direction D1 and the resistance RV in the second direction D2, and the voltage drop may occur. For example, the first power voltage ELVDD1 may be applied to an upper area and a lower area of the first block BL1. The first power voltage ELVDD1 may be applied to a first position P1 using the first current source CS1 and a fifth position P5 using the second current source CS2. Therefore, a voltage of the first position P1 may be the first power voltage ELVDD1, and a voltage of the fifth position P5 may be the first power voltage ELVDD1. In case that the position of the first block BL1 moves away from the upper area of the first block BL1, the voltage drop of the first block BL1 may increase. In case that the position of the first block BL1 moves away from the lower area of the first block BL1, the voltage drop of the first block BL1 may increase. Therefore, in case that the position of the first block BL1 moves away from the upper area of the first block BL1 and then approaches the lower area of the first block BL1, a voltage of the first block BL1 may decrease and then increase. For example, the position of the first block BL1 may move away from the lower area of the first block BL1 in the order of the first position P1, the second position P2, the third position P3, and the fourth position P4, and the voltage drop of the first block BL1 may increase and then decrease in the order of the first position P1, the second position P2, the third position P3, and the fourth position P4. In case that the voltage of the first position P1 is ELVDD1, a voltage of the second position P2 may be ELVDD1-ΔV1, a voltage of the third position P3 may be ELVDD1-ΔV2, and a voltage of the fourth position P4 may be ELVDD1-ΔV3. Therefore, the voltage may increase and decrease in the order of ΔV1, ΔV2, and ΔV3. For example, the position of the first block BL1 may be moved away from the upper area of the first block BL1 in the order of the fifth position P5, the sixth position P6, the seventh position P7, and the eighth position P8, and the voltage drop of the first block BL1 may increase and then decrease in the order of the fifth position P5, the sixth position P6, the seventh position P7, and the eighth position P8. In case that the voltage of the fifth position P5 is ELVDD1, a voltage of the sixth position P6 may be ELVDD1-ΔV4, a voltage of the seventh position P7 may be ELVDD1-ΔV5, and a voltage of the eighth position P8 may be ELVDD1-ΔV6. Therefore, the voltage may increase and then decrease in the order of ΔV4, ΔV5, and ΔV6.

FIG. 12 is a graph showing a voltage of the first position P1, a voltage of the second position P2, a voltage of the third position P3, and a voltage of the fourth position P4. As described above, the voltage drop may increase and then decrease in the order of the first position P1, the second position P2, the third position P3, and the fourth position P4. For example, the voltage of the first block BL1 may decrease and then increase in the order of the first position P1, the second position P2, the third position P3, and the fourth position P4.

Although FIG. 12 shows the voltage of the first block BL1, FIG. 13 shows the voltage of the first block BL1, the voltage of the second block BL2, the voltage of the third block BL3, and the voltage of the fourth block BL4. The fourth power voltage ELVDD4 may be alternately applied to the upper area and the lower area of the fourth block BL4, and in case that a position of the fourth block BL4 moves away from the lower area of the fourth block BL4, a voltage of the fourth block BL4 may decrease and then increase. The third power voltage ELVDD3 may be alternately applied to the upper area and the lower area of the third block BL3, and in case that a position of the third block BL3 moves away from the lower area of the third block BL3, a voltage of the third block BL3 may decrease and then increase. The second power voltage ELVDD2 may be alternately applied to the upper area and the lower area of the second block BL2, and in case that a position of the second block BL2 moves away from the lower area of the fourth block BL4, a voltage of the second block BL2 may decrease and then increase. The first power voltage ELVDD1 may be alternately applied to the upper area and the lower area of the first block BL1, and in case that the position of the first block BL1 moves away from the lower area of the first block BL1, the voltage of the first block BL1 may decrease and then increase.

As shown in FIG. 13, a voltage may not change rapidly at a boundary between the first block BL1 and the second block BL2, a boundary between the second block BL2 and the third block BL3, and a boundary between the third block BL3 and the fourth block BL4. Therefore, the boundary line due to the luminance difference at the boundary between the first block BL1 and the second block BL2, the boundary between the second block BL2 and the third block BL3, and the boundary between the third block BL3 and the fourth block BL4 may not be recognized by the user.

As such, each of the power voltages ELVDD may be alternately applied to the upper area and the lower area of each of the blocks BL. Accordingly, the boundary line due to the luminance difference at the boundary between the blocks BL may not be visible to the user.

Figure 14:
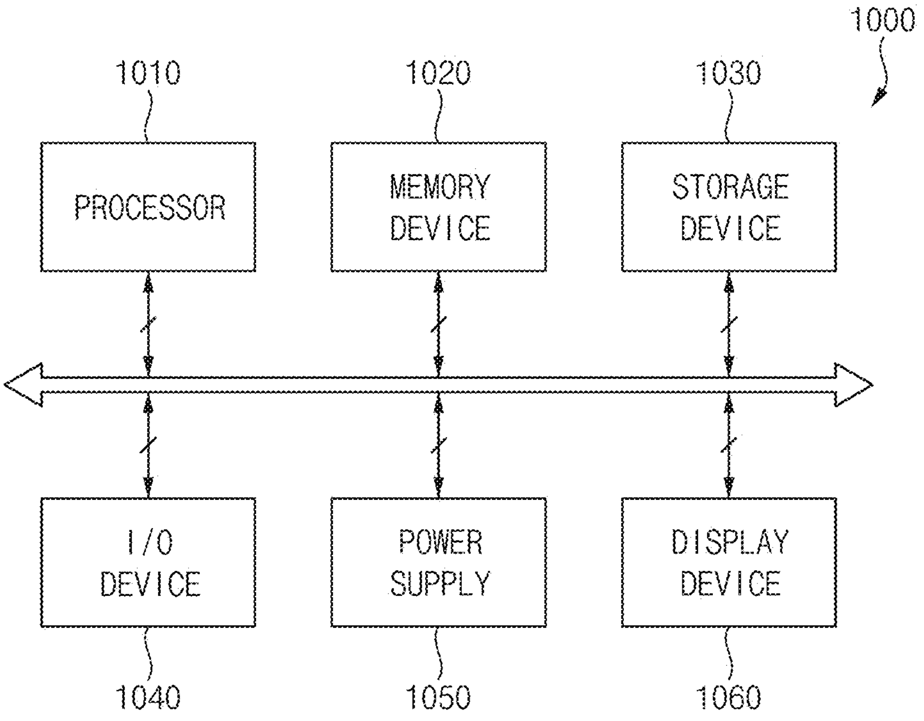
FIG. 14 is a schematic block diagram showing an electronic device.
Figure 15:
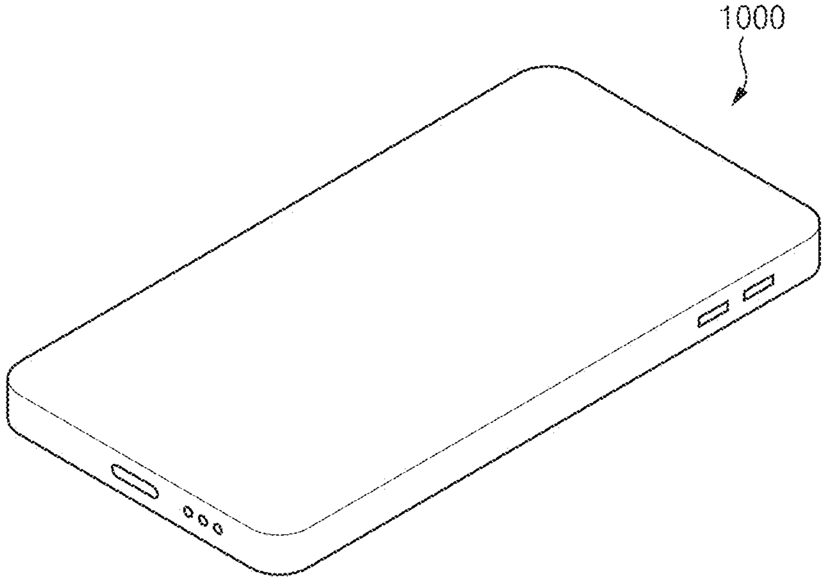
FIG. 15 is a schematic diagram showing an embodiment in which an electronic device of FIG. 11 is implemented as a smartphone.

FIG. 14 is a schematic block diagram showing an electronic device 1000. FIG. 15 is a schematic diagram showing an embodiment in which an electronic device 1000 of FIG. 11 is implemented as a smartphone.

Referring to FIGS. 14 and 15, an electronic device 1000 may include a processor 1010, a memory device 1020, a storage device 1030, an input/output I/O device 1040, a power supply 1050, and a display device 1060. The display device 1060 may be the display device 10 of FIG. 1. For example, the electronic device 1000 may further include a plurality of ports for communicating with a video card, a sound card, a memory card, a universal serial bus USB device, other electronic device, and the like.

In an embodiment, as shown in FIG. 15, the electronic device 1000 may be implemented as a smartphone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display HMD device, and the like.

The processor 1010 may perform various computing functions. The processor 1010 may be a micro processor, a central processing unit CPU, an application processor AP, and the like. The processor 1010 may be coupled to other components via an address bus, a control bus, a data bus, and the like. Further, the processor 1010 may be coupled to an extended bus such as a peripheral component interconnection PCI bus.

The memory device 1020 may store data for operations of the electronic device 1000. For example, the memory device 1020 may include at least one nonvolatile memory device such as an erasable programmable read-only memory EPROM device, an electrically erasable programmable read-only memory EEPROM device, a flash memory device, a phase change random access memory PRAM device, a resistance random access memory RRAM device, a nano floating gate memory NFGM device, a polymer random access memory PoRAM device, a magnetic random access memory MRAM device, a ferroelectric random access memory FRAM device, and the like and/or at least one volatile memory device such as a dynamic random access memory DRAM device, a static random access memory SRAM device, a mobile DRAM device, and the like.

The storage device 1030 may include a solid state drive SSD device, a hard disk drive HDD device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The embodiments may be applied to any display device and any electronic device including the touch panel. For example, the embodiments may be applied to a mobile phone, a smart phone, a tablet computer, a digital television TV, a 3D TV, a personal computer PC, a home appliance, a laptop computer, a personal digital assistant PDA, a portable multimedia player PMP, a digital camera, a music player, a portable game console, a navigation device, etc.

The foregoing is illustrative of the invention and is not to be construed as limiting thereof. Although a few embodiments of the invention have been described, those skilled in the art will readily appreciate that many modifications are possible in embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A display device comprising:

a display panel including a first block and a second block; and a display panel driver that generates a first power voltage based on a max grayscale of input image data for the first block, generates a second power voltage based on a max grayscale of input image data for the second block, and outputs the first power voltage and the second power voltage to the display panel, wherein the display panel driver alternately outputs the first power voltage to an upper area and a lower area of the first block and alternately output the second power voltage to an upper area and a lower area of the second block.

2. The display device of claim 1, wherein the first block is positioned on the second block.

3. The display device of claim 1, wherein the first block includes horizontal power lines extending in a horizontal direction and to which the first power voltage is applied, and vertical power lines extending in a vertical direction and to which the first power voltage is applied, and wherein the second block includes horizontal power lines extending in the horizontal direction and to which the second power voltage is applied, and vertical power lines extending in the vertical direction and to which the second power voltage is applied.

4. The display device of claim 1, wherein, as the max grayscale of the input image data for the first block is large, the first power voltage is large, and wherein as the max grayscale of the input image data for the second block is large, the second power voltage is large.

5. The display device of claim 1, wherein a voltage of the upper area of the first block and a voltage of the lower area of the first block are the first power voltage, and wherein a voltage of the upper area of the second block and a voltage of the lower area of the second block are the second power voltage.

6. The display device of claim 1, wherein, in case that a position of the first block moves away from the upper area of the first block or the lower area of the first block, a voltage drop of the first block increases.

7. The display device of claim 6, wherein, in case that a position of the second block moves away from the upper area of the second block or the lower area of the second block, a voltage drop of the second block increases.

8. The display device of claim 7, wherein, in case that the position of the first block moves away from the upper area of the first block and approaches the lower area of the first block, a voltage of the first block decreases and then increases.

9. The display device of claim 8, wherein, in case that the position of the second block moves away from the upper area of the second block and approaches the lower area of the second block, a voltage of the second block decreases and then increases.

10. The display device of claim 9, wherein, in case that the first power voltage is substantially equal to the second power voltage, the voltage of the lower area of the first block is substantially equal to the voltage of the upper area of the second block.

11. The display device of claim 1, wherein, in case that the first power voltage is different from the second power voltage, the display panel driver performs a gamma correction on the input image data for the first block and the input image data for the second block.

12. The display device of claim 11, wherein, in case that the gamma correction is performed, for a same grayscale, a luminance of the first block is substantially equal to a luminance of the second block.

13. An electronic device comprising:

a display panel including a first block and a second block;

a display panel driver that generates a first power voltage based on a max grayscale of input image data for the first block, generates a second power voltage based on a max grayscale of input image data for the second block, and outputs the first power voltage and the second power voltage to the display panel; and a power supply that provides a power to the display panel and the display panel driver, wherein the display panel driver alternately outputs the first power voltage to an upper area and a lower area of the first block and alternately outputs the second power voltage to an upper area and a lower area of the second block.

14. The electronic device of claim 13, wherein the first block is positioned on the second block.

15. The electronic device of claim 13, wherein the first block includes horizontal power lines extending in a horizontal direction and to which the first power voltage is applied, and vertical power lines extending in a vertical direction and to which the first power voltage is applied, and wherein the second block includes horizontal power lines extending in the horizontal direction and to which the second power voltage is applied, and vertical power lines extending in the vertical direction and to which the second power voltage is applied.

16. The electronic device of claim 13, wherein, as the max grayscale of the input image data for the first block is large, the first power voltage is large, and wherein as the max grayscale of the input image data for the second block is large, the second power voltage is large.

17. The electronic device of claim 13, wherein a voltage of the upper area of the first block and a voltage of the lower area of the first block are the first power voltage, and wherein a voltage of the upper area of the second block and a voltage of the lower area of the second block are the second power voltage.

18. The electronic device of claim 13, wherein, in case that a position of the first block moves away from the upper area of the first block or the lower area of the first block, a voltage drop of the first block increases.

19. The electronic device of claim 18, wherein, in case that a position of the second block moves away from the upper area of the second block or the lower area of the second block, a voltage drop of the second block increases.

20. The electronic device of claim 19, wherein, in case that the position of the first block moves away from the upper area of the first block and approaches the lower area of the first block, a voltage of the first block decreases and then increases.

* * * * *